US008364527B2

(12) United States Patent
Bashardoost et al.

(10) Patent No.: US 8,364,527 B2
(45) Date of Patent: Jan. 29, 2013

(54) SYSTEM AND METHOD FOR ADVERTISING GOODS AND SERVICES USING A SHORT IDENTIFYING CODE

(76) Inventors: Farhad Bashardoost, Anaheim, CA (US); Alireza Akhlaghinejad, Anaheim, CA (US)

( * ) Notice: Subject to any disclaimer, the term of this patent is extended or adjusted under 35 U.S.C. 154(b) by 1470 days.

(21) Appl. No.: 11/670,413

(22) Filed: Feb. 1, 2007

(65) Prior Publication Data

US 2007/0233662 A1  Oct. 4, 2007

Related U.S. Application Data

(60) Provisional application No. 60/780,116, filed on Mar. 8, 2006, provisional application No. 60/781,936, filed on Mar. 13, 2006, provisional application No. 60/811,025, filed on Jun. 5, 2006.

(51) Int. Cl.
*G06Q 30/00* (2006.01)
(52) U.S. Cl. .............. 705/14.4; 705/14.49; 705/14.73; 705/26.1; 705/27.1
(58) Field of Classification Search ............... 705/14.4, 705/14.49, 14.73, 26–27
See application file for complete search history.

(56) References Cited

U.S. PATENT DOCUMENTS

| | | | |
|---|---|---|---|
| 5,799,151 A * | 8/1998 | Hoffer | 709/204 |
| 5,978,773 A | 11/1999 | Hudetz et al. | |
| 6,728,361 B1 * | 4/2004 | Ouyang | 379/221.08 |
| 6,769,018 B2 * | 7/2004 | Gagnon | 709/218 |
| 6,853,979 B1 | 2/2005 | Bass | |
| 6,898,571 B1 * | 5/2005 | Val et al. | 705/14.39 |
| 7,082,409 B1 | 7/2006 | Cherry | |
| 7,424,442 B2 * | 9/2008 | Wong et al. | 705/14.68 |
| 2001/0056372 A1 | 12/2001 | Rogan et al. | |
| 2002/0087420 A1 | 7/2002 | Higgins et al. | |
| 2002/0161745 A1 | 10/2002 | Call | |
| 2002/0169668 A1 | 11/2002 | Bank et al. | |
| 2005/0055281 A1 | 3/2005 | Williams | |
| 2005/0154648 A1 | 7/2005 | Strause | |
| 2005/0171686 A1 * | 8/2005 | Davis | 701/200 |
| 2005/0246237 A1 | 11/2005 | Hudetz et al. | |
| 2006/0041443 A1 | 2/2006 | Horvath, Jr. | |

OTHER PUBLICATIONS

Parker, "Media lawyer uses Yellow Pages to get back in business," Nov. 20, 1995, Denver Post, MON1 ED, p. E-02.*
PCT International Search Report for PCT/US2007/62937, Applicant: Farhad Bashardoost, Form PCT/ISA/210 and 220, dated Feb. 15, 2008 (4 pages).
PCT Written Opinion of the International Search Authority for PCT/US2007/62937, Applicant: Farhad Bashardoost, Form PCT/ISA/237, dated Feb. 15, 2008 (7 pages).

* cited by examiner

*Primary Examiner* — Adam Levine
(74) *Attorney, Agent, or Firm* — Vista IP Law Group LLP

(57) ABSTRACT

A system and method of providing advertising information from a database of advertising listings using a short, easy to remember alphanumeric identifying code associated each listing. The codes are promoted through various known advertising methods. A consumer, upon observing the ad and the code, can obtain additional information regarding the subject matter of the ad by accessing the system and entering the code. The system receives the request and the code from the consumer and transmits the listing of interest to the consumer. In order to keep the codes short while still providing a large number of listings, each code may be associated with multiple listings. The system may filter the listings associated with a requested code using various data, and may also transmit to the consumer a list of such listings from which the consumer may select the listing of interest.

18 Claims, 3 Drawing Sheets

Step 1: Type in your Personal Information

| | |
|---:|---|
| Email: | |
| Password: | |
| Retype Password: | |
| First Name: | |
| Last Name: | |
| Street Number: | |
| Street Address: | |
| City: | |
| State: | |
| Zip: | |

Step 2: Select the Make and a year of your car

| | |
|---:|---|
| Make: | Acura |
| Year: | 1986 |

[ Next > ]

*Fig. 2*

SYSTEM AND METHOD FOR ADVERTISING GOODS AND SERVICES USING A SHORT IDENTIFYING CODE

RELATED APPLICATIONS

This application claims the benefit of U.S. Provisional Application Nos. 60/780,116, filed Mar. 8, 2006, 60/781,936, filed Mar. 13, 2006 and 60/811,025, filed Jun. 5, 2006, in accordance with 35 U.S.C. Section 119(e), and any other applicable laws. The contents of the aforementioned applications are hereby incorporated herein by reference in their entirety.

FIELD OF THE INVENTION

The present invention relates generally to advertising, and more particularly to a system and method for advertising goods and services using a short, easy to remember code for electronically accessing additional information related to the goods and services.

BACKGROUND OF THE INVENTION

The present invention relates generally to advertising of goods and services. Advertising takes many forms, such as in newspapers, radio, television, billboards, signage such as "For Sale" signs. Moreover, in today's electronic world, advertising is provided over the internet, through hand-held devices (such as personal digital assistants (PDAs), email devices like the Blackberry™, and other wireless handhelds) supporting text messaging, e-mail, faxing and web browsing, and through cellular phones. However, all such advertising has varying limitations due to price, space, and time, depending on the particular advertising medium. For example, a "For Sale" sign posted on an automobile has very limited space for listing information regarding the details of the automobile. In addition, passersby may have only a brief moment to observe the sign. The time constraint issue is often a problem for radio, television and other signage advertising. This presents two problems: (1) the advertisement itself cannot confer all the information desired; and (2) the consumer cannot memorize or take down all the information being provided so that the consumer can evaluate the subject matter being advertised and also contact the seller.

Several methods of solving these problems with advertising have been previously utilized and/or disclosed. The simplest form has been to provide a telephone number at which a potential customer can call the seller to inquire about the subject matter being advertised. However, this method presents several drawbacks. For one, many consumers are hesitant to speak to sellers directly for a number of reasons, such as the desire to avoid pushy salesmen, or because the consumer prefers to remain anonymous while gathering information about a good or service. Furthermore, telephone numbers are relatively long strings of numbers which can be difficult to remember or to jot down. The consumer may not have a writing instrument and paper handy, or she may be driving.

In the era of the internet, advertisers now can include a website address in their advertising so that the consumer can access additional information regarding the good or service and the seller's contact information through the website. However, this type of advertising requires the advertiser to create and maintain a website. This can be an expensive and time-consuming proposition, especially for sellers who are only selling a single item, such as their used automobile, or only a limited number of items.

To avoid each seller having to develop their own website, numerous businesses and methods have been developed to aggregate seller's advertising on a single website. This allows each seller to simply develop their own web page advertising (which can be as simple as filling in the desired information on a web-based form from the particular website), which is then posted on the advertising website. Ebay™ is one well-known example of such a website. The advertising website typically provides a searching feature which allows the customer to search for the seller's product based on various criteria such as the seller's name, type of product, brand name, price, etc. On-line classified advertising operates in much the same way. But this type of system does not address the problem of allowing the seller to easily direct potential customers to their on-line advertisements through the seller's own advertising, such as physical signs or other media advertisements like newspaper, radio or television. For instance, if the seller puts a For Sale sign on his automobile with the website address, the seller must still perform a search on the advertising website and then determine which advertisement is the one of interest.

In order to take advantage of the economic efficiencies of aggregated advertisement websites like Ebay™ and on-online classified ads, but also allow more direct access to a particular ad of interest, several methods of advertising utilizing unique advertiser codes have been disclosed. For example, U.S. Pat. No. 6,853,979, issued to Bass (hereinafter referred to as the "Bass patent"), discloses a method of marketing goods and services in which a physical For Sale sign includes a unique alphanumeric identifier and the website address of the common advertising website. The seller posts advertising information on the website and the website associates the advertising information with the unique alphanumeric identifier. A potential customer can then access the on-line advertisement associated with the sign by logging onto the common advertising website and entering the unique alphanumeric identifier. The Bass patent further discloses that the unique alphanumeric identifier is a sequence of numbers, letter, or numbers and letters, preferably at least 2, 3, 4, 5, or 6 characters in length.

Similar to the Bass patent, U.S. Patent Application Publication No. US 2002/0087420, to Higgins et al. (the "Higgins application"), and U.S. Pat. No. 6,898,571, to Val et al. (the "Val et al. patent"), also disclose methods of advertising utilizing a common advertising website and a unique identification code. The Higgins et al. application only discloses that the code can be a telephone number or other character string. The Val et al. patent discloses that the identification code is a unique alpha-numeric code.

Although the method disclosed in the Bass patent contemplates that the unique identifier can be as few as 2, 3, 4, 5, or 6 characters, making the identifier relatively easy to remember, strings of such a limited number of characters does not allow for very many unique alphanumeric codes. For instance, for a four character string consisting of two letters, followed by two numbers, there are only 67,600 unique strings. And for a five character string consisting of two letters, followed by three numbers, there are only 676,000 unique strings. Considering that EBay™ has literally millions of listings at any one time, this may not be enough listings to provide a short, easy to remember, unique identifier for each advertising listing.

Accordingly, there is a need for an improved system and method of advertising using an electronically accessible identification code which utilizes a short, easy to remember code and a common advertising database.

SUMMARY OF THE INVENTION

The present invention is directed to a system and method of advertising which utilizes a short, easy to remember, identifying code to electronically access advertising information from a common advertising database. The system comprises a database having a plurality of advertising listings. Each listing includes advertising information regarding some subject matter, such as goods and/or services, and each listing is associated with an alphanumeric identifying code.

The alphanumeric identifying codes (also referred to herein as "code" or "codes") are purposely short, easy to remember alphanumeric strings. It is known from studies of the human memory that most people can fairly easily remember alphanumeric strings of 4 to 6 characters or less, and strings of letters comprising 2 or 3 letters followed by 2 or 3 numbers are easily recalled. Thus, the codes according to the present invention may preferably comprise two letters followed by two numbers, such as AA11 or ZA56, or two letters followed by 3 numbers, or three numbers followed by two letters, or three letters followed by three numbers, or any other combination which is relatively easily remembered.

An advertiser desiring to include a listing on the system registers with the provider of the advertising system ("the system provider") and obtains an alphanumeric code, as described above, for their respective listing(s). As used herein, the term "advertiser" is not limited to a seller of goods or a provider of services, but includes any person or entity desiring to provide access to a listing of information regarding any subject matter. For instance, a listing does not have to be commercial in nature, but could simply provide information, such as directions, a message, a greeting, a picture or graphic, or any other format conveying information. Accordingly, although many of the examples of the present invention described herein refer to use of the system and method for advertising goods and/or services, such examples also contemplate the listing of all types of information on any subject matter, as well. The advertiser provides the system provider with the information which is to be included in the listing. The system then includes the listing in the database with the listing associated with the alphanumeric code assigned to the listing.

The advertiser may then promote the listing on the system by placing the alphanumeric code on signs, in newspaper classified ads, or other advertising means, along with an identification of the system provider's access mode(s). The identification of the access mode may be a website address for internet access, a cellular phone number or code for access through a cellular phone, or other appropriate identification for the any other access mode used to provide electronic access to the system.

A consumer, upon learning the code and the access mode, can then access the particular listing through the system. As used herein, the term "consumer" is not limited to potential customers of the goods or services being advertised, but includes anyone using the system to access information in the listings. The system provides electronic access to the database of listings to consumers through any suitable access mode. For instance, the access mode may be any suitable electronic communication system, including without limitation, through the internet, over a cellular phone network, through a PDA having push email, text messaging, faxing and/or web browsing, and/or any other suitable electronic communication system. The consumer simply transmits a request for a listing for the subject matter of interest to the system through the access mode. The request includes the alphanumeric code associated with the desired listing. The system is configured to receive the request from the consumer through the access mode, and to then transmit back to the consumer the listing associated with the code.

In order to limit the number of characters in the code but still accommodate a very large number of listings, each alphanumeric code may be associated with more than one listing in the database. Therefore, in response to receiving a request code from a consumer, the system and method are configured to transmit a list of more than one listing associated with the particular alphanumeric code to the consumer. The consumer then selects one or more listings from the list and the system transmits the information from such listing(s) back to the consumer. In order to determine which of the multiple listings are more relevant to the consumer, the system may also be configured to receive data from the consumer which can be used to determine which of the multiple listings are more relevant to the consumer. Such data could be geographical data, product category of interest data (such as automobiles, appliances, etc.) or other data which can be used to prioritize listings.

Then, the system determines the more relevant listing(s) from the more than one listing associated with the alphanumeric code and either transmits a list of the more relevant listing(s) or transmits the information for the more relevant listing(s). In the former case, the consumer then selects one or more listings from the list and the system transmits the information from such listing(s) back to the consumer.

In another feature of the present invention, the advertising of the code and access mode can be provided on pre-printed signs having a distinctive look which consumers will associate with a particular system provider. The signs can have the codes pre-printed on them such that the signs can be economically printed in high volume and then distributed in order of the sequence of the codes. In this way, the codes are not selected by the advertiser, but are assigned to them by the system provider.

The system and method of the present invention can be used to provide quick and easy access to information such as restaurant information such as menus, location and parking, theater schedules, used item for sale ads, real estate listings. While this list and other examples provided herein are illustrative, the present invention is in no way limited to these examples, but instead includes listing of any type of information. Accordingly, the present invention provides an economical advertising system and method which accommodates a large number of listing while using a short, easy to remember identifying code thereby allowing a consumer to quickly and easily electronically access a desired advertising listing.

BRIEF DESCRIPTION OF THE DRAWINGS

FIG. 2 is sample advertiser information form for use with the advertising system in accordance with one embodiment of the present invention.

DETAILED DESCRIPTION OF THE INVENTION

Figure 1:
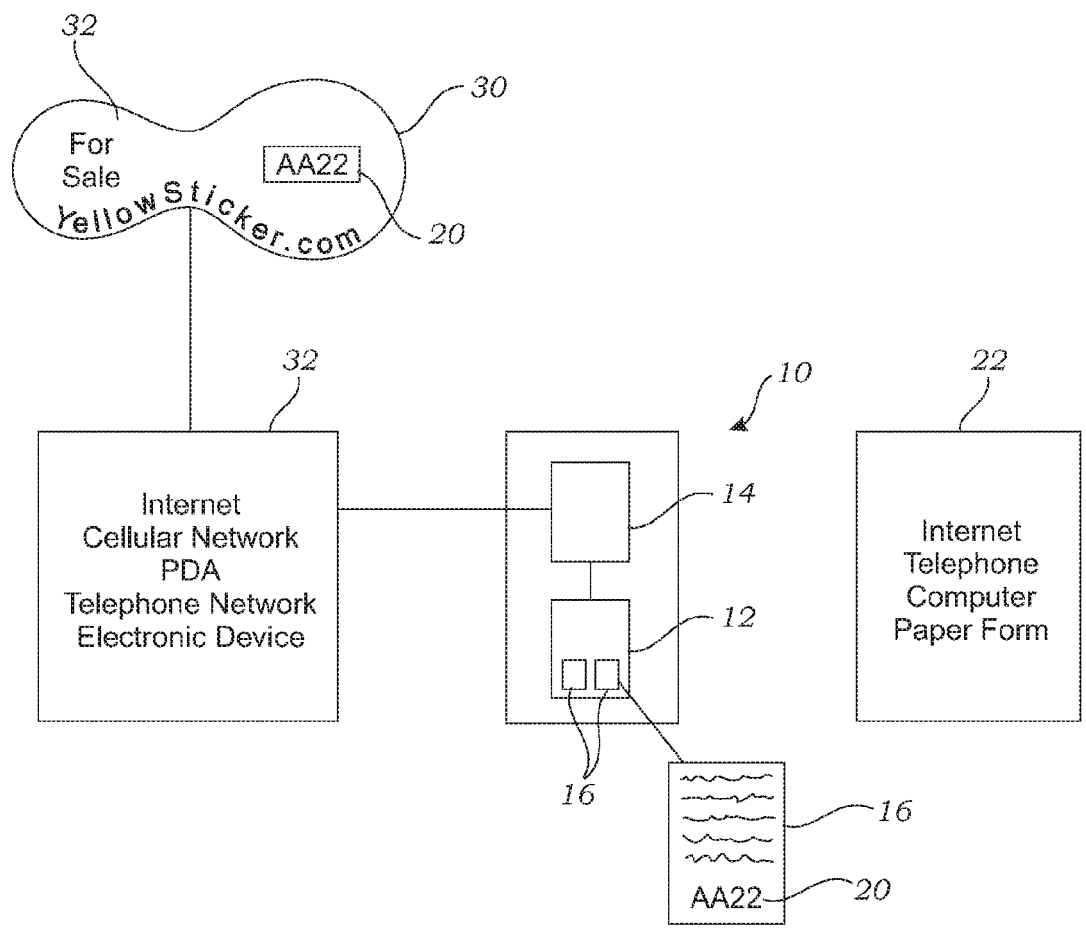
FIG. 1 is schematic representation of an advertising system in accordance with one embodiment of the present invention.

Referring now to FIG. 1, an embodiment of the advertising system 10 according to the present invention is shown with a schematic representation of its functional relationship to other systems and components which may be used with the system 10. The system 10 comprises a database 12 having a plurality of listings 16 contained in electronic form in the database. Each listing 16 includes advertising information regarding some subject matter. As described above, the subject matter will in most cases be goods and/or services, but can be any subject matter including non-commercial material. In order to simplify the description of the invention, the remainder of this description will be directed a system and method for advertising a good for sale, with the understanding that the system and method are not so limited, but may be similarly used for advertising any subject matter of interest.

Each listing 16 in the database 10 includes information regarding the good 18 being advertised. In this example, an automobile 16 is being advertised for sale. The information in the listing 16 may include the advertiser's name and contact information, details regarding the automobile such as make, model, year, mileage, options, features, color, a photograph, and other pertinent information. Each listing in the database 10 is associated with an alphanumeric identifying code 20. Methods for associating each listing 16 with its respective code 20 is within the ordinary skill in the art of software engineers having experience with databases and need not be described herein in further detail. The database 16 may be stored, managed and accessed on any suitable computing system as known by those of ordinary skill in the art.

The alphanumeric codes 20 according to the present invention are relatively short, easy to remember alphanumeric strings. In order to keep the code 20 short, and fairly easy to remember, the code 20 may consist of an alphanumeric string of 4 to 6 characters or less, and preferably 2 or 3 consecutive letters with 2 or 3 consecutive numerals. For instance, in the example of FIG. 1, the code 20 consists of two letters followed by two numerals, namely AA22. Examples of other codes in this format would include AA11, AA12 . . . AB11, AB12 . . . ZZ11, ZZ12 and so on. Examples of codes in other formats include: for two letters followed by three numerals, AA111, AA112, etc; for two numerals followed by two numbers, 11AA, 12AA, etc.; and so on for other formats of alphanumeric codes having 2 or 3 letters with 2 or 3 numerals. In order to limit the number of characters in the code but still accommodate a very large number of listings, the system 10 is configured such that each alphanumeric code 20 may be associated with more than one listing 16 in the database 12.

The system 10 further comprises an electronic communication module 14 which provides electronic access to the system 10. The electronic communication module 14 can be integrated into the computing system containing the database 12, or it can be a separate system. In either case, the electronic communication module 14 in operable communication with the database 14.

The electronic communication module 14 is capable of receiving and transmitting information over any desired access mode, including over the internet through a website, over a phone network including cellular phone networks, through Blackberry™ type push email systems, through any other suitable electronic communication system, and/or any combination of the foregoing.

The system 10 is further configured through hardware and/or software to perform all of the steps of the method of using the system 10, which will now be described in detail, also with reference to FIG. 1. An advertiser desiring to advertise a good 16 for sale on the system 10 registers with the provider of the advertising system ("the system provider") and provides information to be included in the listing 16. The advertiser may provide the information to the system provider through any suitable method, including the advertiser input 22 as shown in FIG. 1. The advertiser input 22 may include any one or more of the following modes: input through a website; over the telephone; through an electronic handheld device; by submitting a physical form to the system provider; or other suitable method.

In one example, the advertiser may access the service provider's website where the website provides an on-line form for the advertiser to complete. An exemplary form for an advertising an automobile is shown in FIG. 2. The information provided by the advertiser is entered into a listing 16 in the database 12.

The system 10 associates the listing 16 with an alphanumeric code 20, as described above. The precise code may be assigned in various ways. For one, the system 10 may automatically assign the code 20 to the new listing 16. Or, the system 10 can prompt the advertiser to enter a desired code 20. In this case, advertiser will be informed of acceptable formats for the code, e.g. 2 letters followed by 2 numbers. The system 10 can be configured to evaluate whether the code 20 chosen by the advertiser is acceptable. For example, if the code 10 chosen by the advertiser has already been used for too many other listings, then the system 10 may prompt the advertiser to try another code 20.

Figure 3:
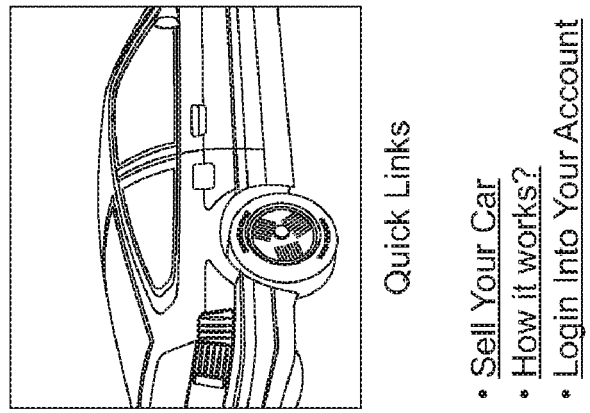
FIG. 3 is sample physical sign for use with the advertising system in accordance with one embodiment of the present invention.
Figure 3:
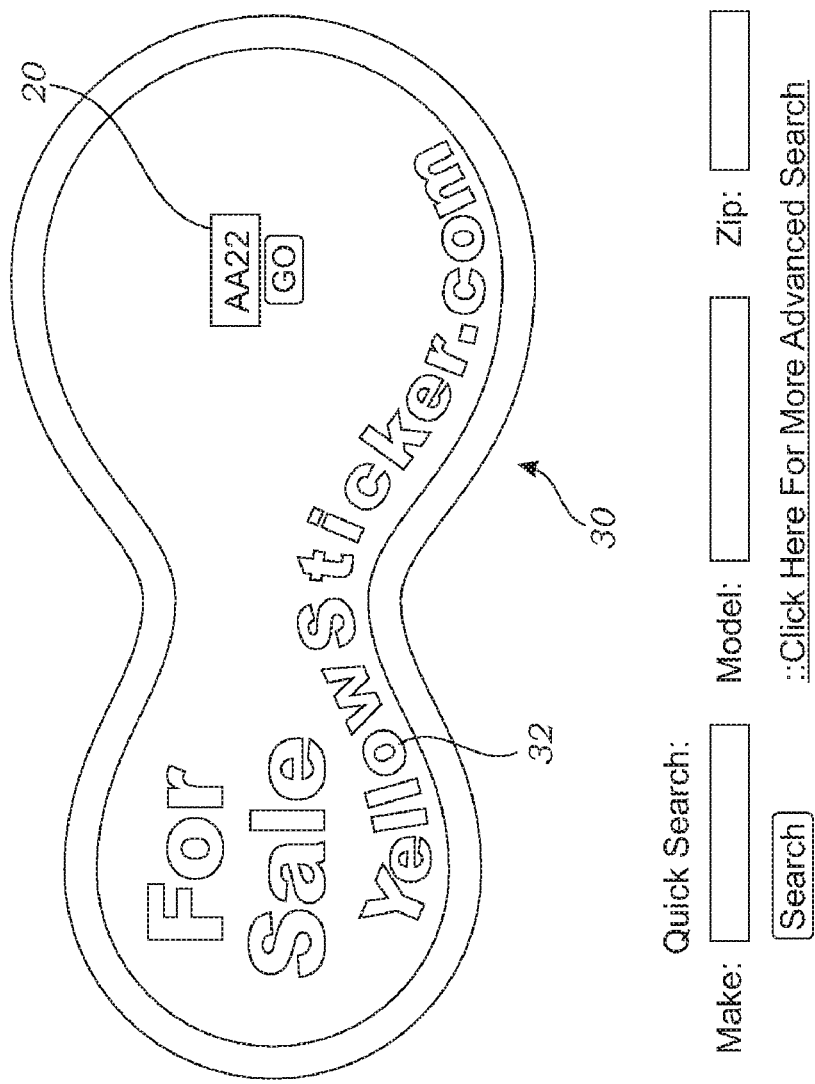

The system 10 informs the advertiser of the precise code 20 for the listing once an acceptable code 20 has been assigned. The system provider may also sell, or otherwise furnish, to the advertiser physical signs and/or electronic images displaying the code 20 along with an identification of the system provider's access mode(s). FIG. 3 shows an example of a graphic 30 for a physical sign or an electronic image which has a space for displaying the code 20 and the website access mode 32 (the web address Yellowsticker.com) for accessing the listing 16 associated with the code 20. Although additional instructions can be included on the advertisement, in many cases this will be enough. Moreover, keeping the advertisement simple may make it easier for an observer to quickly memorize the code 20 and the access mode 32, such that advertisement effectively allows the observer to access the information in the related listing 16.

Referring back to FIG. 1, the access mode 32 is in electronic communication with the electronic communication module 14 of the system 10. The access mode 32 can be any suitable communication system as described above. The identification of the particular access mode 32 will correspond to the mode. For a website, the identification will be a web address. For a telephone, it may be a telephone number such as a toll-free number. For a cellular phone or other electronic devices, it may be a code comprising numerals, symbols and/or letters.

Once the advertiser has placed a listing 16 on the system 10 and has its associated code 20, the advertiser preferably includes the code 20 and the access mode 32 in other types of advertising promoting the good 18. For instance, physical signs using the graphic 30 in FIG. 3 may be placed at the location of the good 18, such as on or in the automobile 18. The code 20 and access mode 32 can be included in radio and television ads, in printed advertising and classified ads, in other internet ads, and in any other form of advertising, marketing and promotion.

A consumer who has observed the ad 30 and is interested in obtaining additional information about the good 18 related to the ad 30, can then access the listing 16 corresponding to the code 20 through the system 10. First, the consumer uses the particular access mode 32 related to the code 20 of interest. For instance, for a website based access mode 32, the consumer accesses a website which is in operable communication with the system 10; for a telephone based access mode 32, the consumer calls a telephone number, such as a toll-free number; and so on for each respective type of access mode.

The consumer then transmits a request for a listing of interest to the system 10 wherein the request includes the code 20. The system 10 receives the request and the code and then transmits back to the consumer the listing(s) 16 associated with the code 20. The system 10 preferably transmits the listings 26 back to the consumer over the same access mode 32, but the present invention is not so limited.

As described above, it is contemplated that more than one listing 16 may be associated with each distinctive code 20. Therefore, for a code 20 which has more than one listing associated with it, the system may transmit to the consumer all of such listings, or a list of each of the listings, associated with the particular code 20.

The list of listings includes only a short description for each listing which differentiates the listing, as opposed to providing all of the information in the listing. The consumer can then select one or more listings from the list and the system receives the selection and transmits the selected listings to the consumer.

The system 10 may also be configured to automatically filter multiple listing associated with the same code 20 using various data and methods. In one method, the system receives data from the consumer which can be used to determine which of the multiple listings are more relevant to the consumer. Such data can be explicitly requested from the consumer, or it can be data that is inherently found in a consumer's request. Examples of explicit requests include, without limitation: the consumer's area code, postal code, or other geographical information; the category of goods or services related to the request, such as used automobiles, real estate, jewelry, etc; and/or the consumer's price range. Inherent data may include: use of caller identification to determine the location of the consumer; use of internet protocol (IP) addresses to determine the location of the consumer; and/or GPS data sent from cellular phones and other handheld electronic devices. Using this data, the system 10 determines the more relevant listing(s) from the multiple listings associated with a particular code and then can transmit to the consumer either (a) a list of only the more relevant listing(s), or (b) the actual listings for the more relevant listing(s).

In addition to allowing a consumer to access a listing by using the code for the particular listing, the system 10 can be configured to allow a consumer to browse and/or search the database 12 of listings 16 using categories, search terms, keywords or other search methods as such as those commonly used to search Ebay™ listing or on-line classifieds. This is most easily implemented using the website type of access mode 32, but can also be adapted for other access modes 32, as well. In this way, if a consumer who accesses a particular listing 16 using a code 20 finds that they are not interested in the subject matter of that particular listing, the consumer can then browse other listings 16 using the system 10.

In another aspect of the present invention, the system 10 can be configured to facilitate communication between the consumer and the advertiser, such as by email, telephone, or other suitable method. The system 10 can present an email form to the consumer which the consumer can fill out with questions or other information for the advertiser. The system 10 can then send the consumer request to the advertiser. The advertiser can then respond through the system 10. This has the advantage that both the consumer and the advertiser can remain completely anonymous to the other, if they so desire. Moreover, the system 10 can be configured to execute a sales transaction between the consumer and the advertiser. The consumer and the advertiser can arrange payment and delivery of the good through various known payment methods, such as Paypal™ or a credit card. Furthermore, the system 10 can execute the transaction whereby the consumer pays the system provider, and then forwards payment to the advertiser. The system provider may deduct a fee, such as a percentage commission of the transaction amount, as a fee for providing the service.

The system provider can realize additional revenue for providing the system 10 by charging a fee to the advertisers for each listing and related materials (e.g. signs), by charging a fee to consumers who complete a transaction based on a listing, and/or by selling advertising on the system's website. The system provider may also receive fees based on traffic for a particular listing or upon any other commercial criteria. The system provider can charge different fees for easier to remember codes, such as 2 or 3 character codes; or for different business or product categories.

While the present invention has been fully described above with particularity and detail in connection with what is presently deemed to be the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. A method of providing information to a consumer from a plurality of listings using an identifying code, each listing having information obtained from an advertiser and associated with a good or service, the method comprising the following steps:

receiving, at a computing system, via an electronic communication network, a request from the consumer for a listing of interest regarding a good or service of interest, the request including a requested code comprising an alphanumeric code associated with said listing of interest;

accessing an electronic database comprising the plurality of listings, each listing being a classified ad for a specific good or service being advertised, each listing being associated with an alphanumeric code having no more than 6 characters, wherein the alphanumeric code is associated with more than one listing wherein such listings having the same alphanumeric code are for different goods or services;

determining, by the computing system, at least one matching listing in the electronic database having an associated alphanumeric code which matches the requested code; and transmitting, via said electronic communication network, the at least one matching listing to the consumer.

2. The method of claim 1, further comprising the steps of:

transmitting a list of more than one matching listing to the consumer, each listing of said matching listings being associated with the requested code, wherein each listing of said matching listings is for a different good or service; and receiving, by the computing system, a selection from the consumer of one or more listings from said list of matching listings; and transmitting, from the computing system, via said electronic communication system, to the consumer the one or more listings selected by the consumer.

3. The method of claim 1, further comprising:
receiving, by the computing system, geographical data from the consumer indicating the geographical location of the consumer; and
determining, by the computin system, the listing of interest from the more than one listing associated with said requested code based on said geographical data.

4. The method of claim 1, the method further comprising:
receiving, by the computing system, geographical data from the consumer indicating the geographical location of the consumer; and
determining, by the computing system, from the more than one listing associated with said requested code the more relevant listings based on said geographical data;
transmitting a list of said more relevant listings to the consumer; and
receiving from the consumer a selection from said list of said more relevant listings.

5. The method of claim 1, further comprising:
receiving data from the consumer which can be used to determine which of the more than one listing associated with said requested code are more relevant to the consumer; and
determining, by the computin system, the listing of interest from the more than one listing associated with said requested code based on said data.

6. The method of claim 5 wherein said data comprises an IP address.

7. The method of claim 6 wherein said data further comprises one or more of the following: a telephone number, an area code, a postal code, or a category of goods or services.

8. The method of claim 5 wherein said data comprises one or more of the following: an IP address, a telephone number, an area code, a postal code, or a category of goods or services.

9. The method of claim 1, further comprising:
receiving data from the consumer which can be used to determine which of the more than one listing associated with said requested code are more relevant to the consumer; and
determining, by the computing system, from the more than one listing associated with said requested code the more relevant listings based on said data;
transmitting a list of said more relevant listings to the consumer; and
receiving, by the computing system, from the consumer a selection from said list of said more relevant listings.

10. The method of claim 9 wherein said data comprises an IP address.

11. The method of claim 9 wherein said data comprises one or more of the following: an IP address, a telephone number, an area code, a postal code or a category of goods or service.

12. The method of claim 1, further comprising:
receiving information from the consumer and transmitting the information to the advertiser for said listing of interest; and
receiving information from the advertiser for said listing of interest and transmitting the information to the consumer.

13. The method of claim 1, further comprising:
receiving information from an advertiser for a listing;
creating a listing using said information and entering said listing into said database, and associating said listing with its alphanumeric code;
providing said advertiser with said alphanumeric code for said listing.

14. A method of providing information to a consumer from a plurality of listings using an identifying code, each listing having information obtained from an advertiser and associated with a subject matter, the method comprising the following steps:
providing a database comprising the plurality of listings, each listing being associated with an alphanumeric code having no more than 6 characters, wherein alphanumeric codes are assigned to each listing sequentially as each listing is registered, and then the alphanumeric codes are repeated once all alphanumeric codes have been assigned at least once;
receiving, by a computing system, a request from the consumer for a listing of interest from said plurality of listings, the request including the requested code associated with said listing of interest, and wherein said requested code is associated with more than one listing in said plurality of listings;
determining, by the computing system, at least one matching listing in the electronic database having an associated alphanumeric code which matches the requested code; and
transmitting the at least one matching listing associated with said requested code to the consumer.

15. A system for providing information to a consumer from a plurality of listings using an identifying code, each listing having information obtained from an advertiser and associated with a good or service of the advertiser, the system comprising:
a computing system having an electronic database comprising the plurality of listings, each listing being a classified ad for a specific good or service being advertised, each listing being associated with an alphanumeric code having no more than 6 characters, wherein the alphanumeric code is associated with more than one listing wherein such listings having the same alphanumeric code are for different goods or services;
an electronic communication system in operable communication with said computing system, said electronic communication system configured to provide communication between an access mode and the computing system; and
wherein said computing system is configured to perform the following steps:
receiving a request via said electronic communication system from the consumer for a listing of interest from said plurality of listings, the request including a requested code comprising an alphanumeric code associated with said listing of interest;
accessing said electronic database comprising the plurality of listings to identify listings associated with the requested code;
transmitting, via said electronic communication system, at least one listing associated with said requested code to the consumer.

16. The system of claim 15, wherein said computing system is further configured to perform the following steps:
transmitting a list of more than one matching listing to the consumer, each listing of said matching listings being associated with said requested code, wherein each listing of said matching listings is for a different good or service;
receiving, at said computing system, a selection from the consumer of one or more listings from said list of matching listings; and
transmitting, from said computing system, via said electronic communication system, to the consumer the one or more listings selected by the consumer.

17. The system of claim 15, wherein said system is configured to: receive geographical data from the consumer indicating the geographical location of the consumer; process said geographical data to determine the more relevant listings based on said geographical data; transmit a list of said more relevant listings to the consumer; and receive from the consumer a selection from said list of said more relevant listings.

18. The system of claim 15, wherein said system is configure to: receive data from the consumer which can be used to determine which of the more than one listing associated with said requested code are more relevant to the consumer; process said data to determine from the more than one listing associated with said requested code the more relevant listings based on said data; transmit a list of said more relevant listings to the consumer; and receive from the consumer a selection from said list of said more relevant listings.

\* \* \* \* \*